May 27, 1924.

R. G. ESTERBY

TRANSMISSION MECHANISM

Filed Dec. 22, 1921

Inventor
Raymond G. Esterby
By his Attorneys

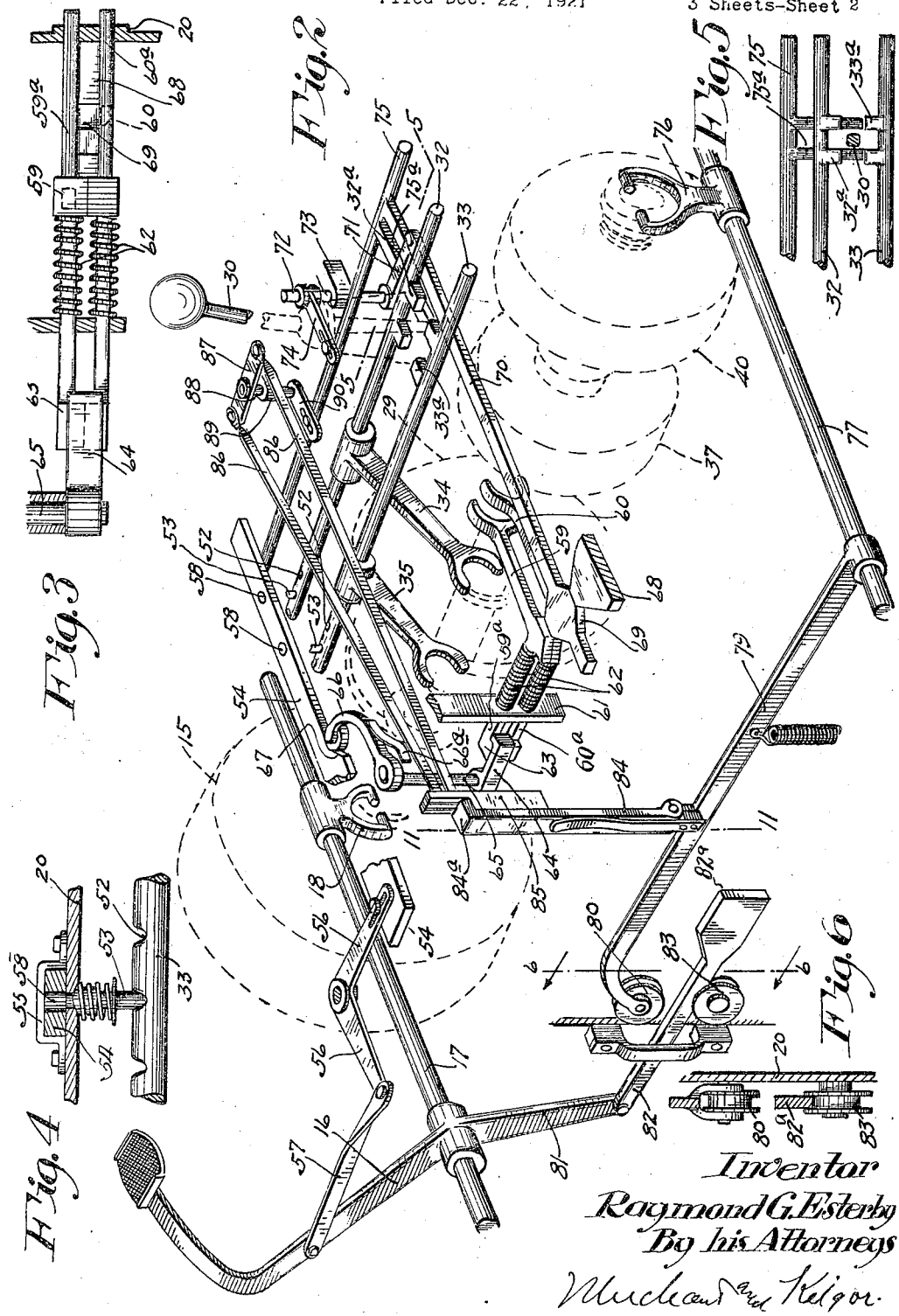

May 27, 1924.
R. G. ESTERBY
1,495,781
TRANSMISSION MECHANISM
Filed Dec. 22, 1921
3 Sheets-Sheet 3
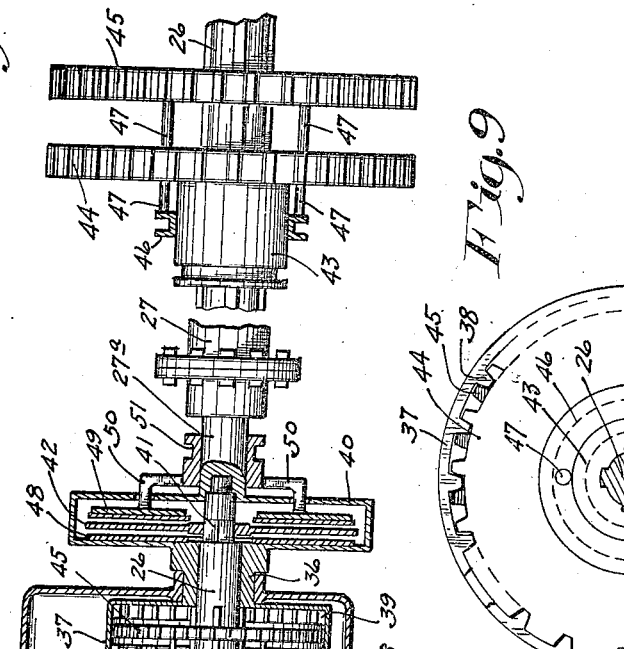
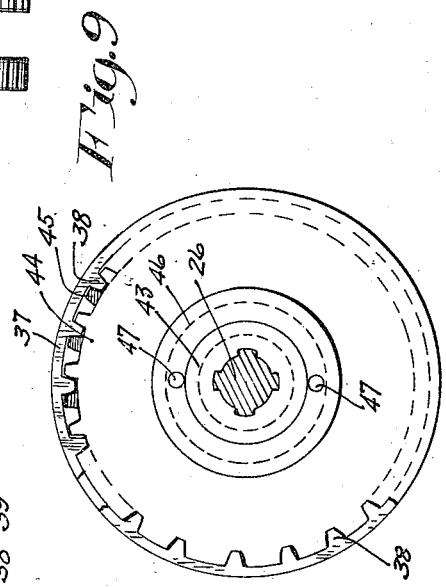
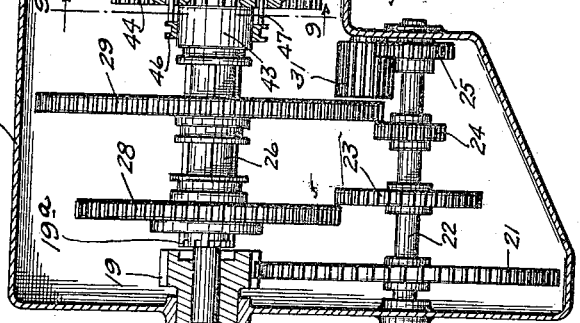
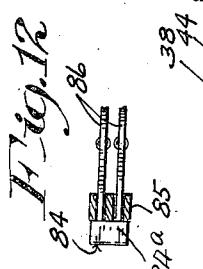
Inventor
Raymond G. Esterby
By his Attorneys
Merchant and Kilgore Patented May 27, 1924.

1,495,781

UNITED STATES PATENT OFFICE.

RAYMOND G. ESTERBY, OF BAY CITY, WISCONSIN.

TRANSMISSION MECHANISM.

Application filed December 22, 1921. Serial No. 524,237.

*To all whom it may concern:*

Be it known that I, RAYMOND G. ESTERBY, a citizen of the United States, residing at Bay City, in the county of Pierce and State of Wisconsin, have invented certain new and useful Improvements in Transmission Mechanism; and I do hereby declare the following to be a full, clear, and exact description of the invention, such as will enable others skilled in the art to which it appertains to make and use the same.

My invention relates to transmission mechanism for motor-propelled vehicles and provides certain highly important improvements therein, all as will hereinafter appear; and, generally stated, the invention consists of the novel devices and combinations of devices hereinafter described and defined in the claims.

All or nearly all commercial motor-propelled vehicles, with the exception of the well known Ford car, employ variable speed reversible transmission gear mechanisms of the sliding selective type. In this generally used type of gear mechanism, a great deal of damage and frequent breaking of gears has resulted from unskillful shifting of gears while the car is in motion and, in fact, much skill is required to shift gears when the car is running at any considerable speed or the engine is running at high speed, without at least producing a very serious chattering or scraping of gears, and frequently it is necessary to bring the car to a standstill before the gears can be properly shifted. This difficulty in the shifting of gears is due to the fact that one of the gears to be engaged will be driven at engine speed and the other at the speed of the transmission shaft, which latter will be driven by the advance movement of the car when the engine clutch is released, and both of which gear-driving actions are not only positive but usually differ greatly in velocity.

My invention provides means which makes it an easy matter to shift gears at all speeds without danger of breaking, chattering or scraping of the gears. As another important feature, the invention provides an automatic gear shift lock, which makes it impossible to shift gears except when the clutch is released, and at which time the transmission shaft is uncoupled from the engine shaft, and hence the gears are not subject to driving strain. The invention also involves other important novel features, as will hereinafter more fully appear.

In the accompanying drawings, which illustrate a commercial form of the mechanism as applied to an automobile having a transmission mechanism with shift gears of the sliding or selective type, like characters indicate like parts throughout the several views.

Referring to the drawings:

Fig. 2 is a perspective view of the parts shown in Fig. 1, some of the parts being indicated by dotted lines only, and the transmission casing being omitted, except that fragments thereof are shown as bearing elements for certain of the devices;

Fig. 3 is a fragmentary section on the line 3—3 of Fig. 1;

Fig. 4 is a fragmentary section on the line 4—4 of Fig. 1;

Fig. 5 is a fragmentary horizontal section approximately on the line 5—5 of Fig. 2;

Fig. 6 is a fragmentary vertical section on the line 6—6 of Fig. 2;

Fig. 7 is a vertical section on the line 7—7 of Fig. 1;

Fig. 8 is an enlarged plan view showing the gear-like driving elements of a so-called coupling clutch that is interposed in the transmission;

Fig. 9 is a section on the line 9—9 of Fig. 7, some parts being broken away, the parts illustrated being nearly on the same scale as Fig. 8;

Fig. 10 is a diagrammatic view illustrating a relative arrangement of the teeth of the driving and driven gear-like elements of the transmission coupling clutch;

Fig. 11 is a fragmentary vertical section taken approximately on the line 11—11 of Fig. 2; and Fig. 12 is a horizontal section on the line 12—12 of Fig. 11.

Figure 1:
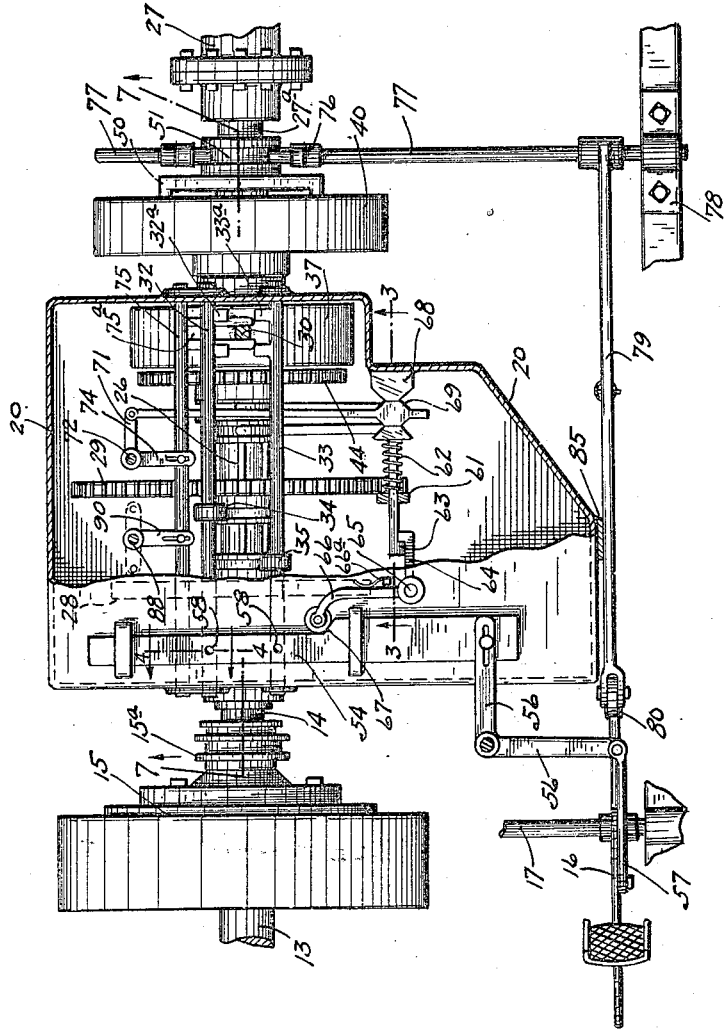
Fig. 1 is a plan view with some parts broken away and some parts sectioned, illustrating the invention and showing particularly those parts that are between the engine and the transmission shaft proper.

The engine shaft 13 is arranged to be connected to the clutch shaft 14 by a spring-set friction clutch 15 in the usual or any suitable way. This clutch 15 is the main driving clutch of the transmission mechanism and its movable element is arranged to be moved to open or release the clutch, preferably by the usual clutch pedal 16 secured on the rock shaft 17 equipped with a clutch-shifting fork 18 engageable in the usual way with the grooved hub 15ª of said clutch 15. The so-called clutch shaft 14, in the arrangement illustrated, carries a driving pinion 19 located within the gear housing 20 and engageable with a large spur gear 21 of the countershaft 22. This countershaft 22, as usual, is provided with spur gears 23, 24 and 25, respectively, for intermediate, low and reverse drive.

In the transmission mechanism hitherto generally used, the shift gear shaft has been permanently connected to the transmission shaft proper, but in my improved arrangement, the shift gear shaft 26 is an individual shaft suitably journaled in the gear housing 20 in axial alignment with the clutch shaft 14 and with the transmission shaft proper 27.

Keyed to slide on the shift gear shaft 26 are spur gears 28 and 29, which, when in neutral position of the gear shift lever 30, are in the inoperative positions shown in Fig. 7. The pinion 19 and slide gear 28 have co-operating half clutches 19ª that are engaged for high speed drive.

The shift gear 28 is slidable into and out of mesh with the intermediate gear 23, while the shift gear 29 is slidable, at will, into mesh with the low gear 24 or with the reverse pinion 31, which latter is journaled to the housing 20 and is in mesh with the reverse gear 25.

The numerals 32 and 33 indicate the customary gear shift rods or slides provided, respectively, with shift forks 34 and 35 that engage grooved hubs of the shift gears 29 and 28. For coupling the slide gear shaft 26 directly to the transmission shaft 27 during the normal transmitting action, I provide the so-called transmission coupling clutch, which, in respect to the main frictional clutch 15, is a sort of a secondary clutch. This transmission clutch, per se, involves novel features of construction and is involved in a very novel combination with other elements presently to be described. In its preferred arrangement, it is constructed as follows:

The numeral 36 indicates a sleeve journaled in a hub of the housing 20 and provided within said housing with a drum-like flange 37 formed open at one side and provided with laterally offset circumferential rows of internal gear teeth 38 and 39. The drum 37 is relatively fixed with relation to a drum-like clutch housing or case 40 that is rigidly secured to a section 27ª of the transmission shaft 27, see particularly Fig. 7. Here it may be noted that the rear end of the slide gear shaft 26 is journaled in and extended through the sleeve 36 and is provided within the clutch case 40 with an angular shank 41 that carries a friction clutch disk 42.

The numeral 43 indicates a collar keyed to rotate with but to slide upon the slide gear shaft 26. This collar 43 has a rigidly secured clutch gear 44. A second clutch gear 45 is keyed to rotate with but slide upon the slide gear shaft 26 and is spaced laterally from the clutch gear 44. A shipper collar 46 is slidably mounted on the collar 43 and is connected to the clutch gear 45 by small rods 47 passed through perforations in the clutch gear 44. It is now important to note that the teeth on the two gears 44 and 45 are alternately omitted on each gear and the teeth on the two gears are circumferentially staggered so that the teeth on the two gears, together, make up a complete sectional tooth spur gear. The internal teeth 38 and 39, on the drum flange 37, are alternately omitted but are axially aligned, as indicated diagrammatically in Fig. 10. The said gear elements 38, 39, 44 and 45 constitute what is herein treated as a transmission coupling clutch, to be hereinafter more fully described, but it may be here stated that the said gear elements do not have rotating gear-acting contact but act simply as clutch elements of peculiar construction and function.

The clutch disk 42, just described, co-operates with two clutch disks 48 and 49 that are connected to rotate with the clutch case 40. The clutch disk 48 is directly secured to one side of the clutch case 40, but the clutch disk 49 is laterally movable and is secured to the prongs 50 of a shipper collar 51. The collar 51 is slidably mounted on the shaft section 27ª and the prongs 50 work through the adjacent side of the clutch case 40 so that the laterally movable disk 49 is caused to rotate with said clutch case and, hence, always to rotate with the transmission shaft 27, clutch drum 37 and its internal clutch gears 38 and 39. Said clutch disks 42, 48 and 49 constitute the frictional elements of what is herein designated as the auxiliary friction clutch, the function of which will fully appear in the description of the operations.

Before proceeding with the description of the automatic clutch-actuating connections and co-operating devices, it is thought desirable to call the reader's attention to these three important actions, to wit:

1. When the clutch gears 44 and 45 are slid out of mesh with the internal gear teeth 38 and 39, as shown in Fig. 7, the slide gear shaft 26, with its gears 28 and 29, will be disconnected from the transmission shaft and will then be free either to stand still or, if rotated at all, will simply be so rotated by slight frictional engagement with the clutch shaft 14 or with the sleeve 36, and can be easily stopped. Under such conditions, it is evident that the slide gears 28 and 29, regardless of the speed of the engine and of the transmission shaft, can be easily slid into mesh with the co-operating gears 23 and 24 without any danger whatever of breaking of gear teeth and without producing any scraping or chattering of gears.

2. When the clutch gears 44 and 45 are slid into engagement with the internal gear teeth 38 and 39 of the clutch drum 37, the slide gear shaft 26 will be positively coupled to the transmission shaft 27 and will then be driven with said transmission shaft, as in the previous or standard constructions.

3. If, while the clutch gears 44 and 45 are disengaged from the internal clutch teeth 38 and 39, the friction clutch disks 48 and 49, by sliding movement of the shipper collar 51, are pressed against intermediate clutch disks 42, the so-called auxiliary friction clutch will temporarily be rendered operative to cause the slide gear shaft 26, slide gears 28 and 29 and clutch gears 44 and 45 to rotate at the same speed as the transmission shaft and, hence, at the same speed as the clutch flange 37 and its internal gear teeth 38 and 39, and this will make it an easy matter to slide said gears 44 and 45, respectively, into mesh with said gear teeth 38 and 39.

At this point, the importance of the interrupted arrangement of the teeth of the gears 44 and 45 and of the internal gear teeth 38 and 39 may be noted. As is evident, when all of the gear tooth elements are rotated at the same speed as just described, either the teeth of the clutch gear 44 will be aligned between the internal teeth 38 or the teeth of the clutch gear 45 will be aligned between the internal teeth 39, so that one or the other of said clutch gears will always be ready to go into action as soon as forced to the right in respect to Fig. 7, and the second gear will be ready to go into action whenever one step of rotary movement is imparted to the slide gear shaft 26 in respect to the transmission shaft or conversely.

The gear shift lever 30 operates gear shift rods 32 and 33 in the usual way and, by transverse swinging movement, is engageable at will either between lugs 32ª on the rod 32 or between lugs 33ª on the rod 33. As in the standard constructions, the gear slide rods 32 and 33 are preferably provided with indentations 52 for cooperation with downwardly spring-pressed gear shift rod detaining plungers mounted in the top of the housing 20, see Figs. 3 and 4. The indentations or notches 52, in the rod 32, represent neutral, low and reverse positions, while the indentations or notches 52, in the rod 33, represent neutral, intermediate and high positions. These so-called detaining plungers 53 in this, as in the older arrangement, prevent accidental movements of the gear shift rods that may be overcome readily when force is applied to said rods through the shift lever 30.

As already indicated as a feature of this invention, I provide a so-called gear shift lock that will prevent the gears from being shifted except when the main driving clutch is released or opened. As a very simple way of incorporating this gear shift lock in selective type of gear shifts, I provide a sliding lock bar 54 mounted to slide in suitable bearings on the gear housing or elsewhere, and one of which bearings is in the form of a guide yoke 55 as shown in Fig. 4. One end of this sliding lock bar 54 is connected to a pivoted bell crank 56, which, in turn, is connected to the clutch pedal 16 by a link 57. In the lock bar 54 are perforations 58 that directly overlie the upper ends of the detaining plungers 53 only when the clutch pedal 16 is moved to clutch-releasing position, and said bar 54 is moved toward the left, as shown in Fig. 2. When the clutch pedal 16 is released, it will be thrown backward and the main clutch 15, by its spring, will be automatically set; and such movement of said pedal will move the perforations 58 of the lock bar 54 out of registration with the plungers 53 and said lock bar will then positively hold said plungers depressed and in positions to positively prevent gear-sliding movements of the rods 32 and 33 while the main clutch is set and power is being transmitted to the car through the transmission mechanism.

The collars 43 and 46, for shifting the clutch gears 44 and 45, have annular grooves engaged respectively by gear shift forks 59 and 60 secured, respectively, to rods 59ª and 60ª mounted to slide in suitable bearings on the housing 20, (see Figs. 2 and 3). As shown, said rods 59ª and 60ª work freely through a fixed guide post 61, between which and said forks coiled springs 62 are compressed. At their front ends, said rods are provided with hook lugs 63 that are engageable with the hooked end of a latch arm 64 carried at the lower end of a short upright rock shaft 65, (see Figs. 1 and 2). The shaft 65, in its upper end, has a latch tripping arm 66 that is provided with a spring 66ª and is adapted to be engaged by a cam surface 67 on the lock bar 54.

Suitably anchored or fixed within the housing 20, in alignment with but just rearward of the secured ends of the forks 59 and 60, is a cam abutment 68. The numeral 69 indicates a cam-acting latch-resetting head, which, when the gear shift lever 30 is in neutral position, is forced between the abutment 68 and the adjacent ends of the gear shifting forks 59 and 60 and then compresses the springs 62 and holds the forks 59 and 60 forward or toward the left in respect to Fig. 2 and positions the clutch gears 44 and 45 in the released positions shown in Fig. 7. The resetting head 69, as shown, is applied on one end of a transversely movable bar or link 70, the other end of which is pivoted to a bell crank arm 71 secured to the lower end of a short upright rock shaft 72 mounted in a suitable bearing 73 on the gear housing 20. At its upper end, the rock shaft 72 has a short arm 74 that is connected to a sliding rod 75 mounted in suitable bearings in the gear housing parallel to the rods 32 and 33. The sliding rod 75 has a laterally projected slotted portion 75ª in which the lower end of the gear-shifting lever 30 is always engaged.

For operating the auxiliary friction clutch, a shipper fork 76 is engaged with an annular groove in the clutch-operating collar 51. As shown, this fork is secured to a transverse rock shaft 77 mounted in suitable fixed bearings 78 and provided with a long forwardly projected arm 79 shown as equipped with a roller 80 at its front end. The clutch pedal 16 or rock shaft 17 is provided with a depending arm 81 pivoted to a cam bar 82 shown as arranged to run on a guide roller 83 just below the roller 80. The cam bar 82 has a vertically expanded head 82ª that will be forced between the rollers 80 and 83 and thereby lift the arm 79 and cause the auxiliary clutch to be released under certain conditions hereinafter described.

The numeral 84 indicates a latch hook pivoted to the arm 79 at its lower end, spring-pressed toward the right in respect to Fig. 2, and provided at its upper end with a hook lug 84ª adapted to be engaged over a latch block or abutment 85 fixed to or within the housing 20. In line with the lug 84ª, the latch block 85 has a vertically slotted upstanding flange 85ª that guides the free ends of two trip rods 86. These trip rods 86 are pivoted to the outer end of a lever 87, which has a short centrally located depending stem 88 mounted in a suitable bearing 89 fixed in the gear housing 20. At its lower end, the stem 88 is provided with an arm 90, which, by a slot and pin connection or the like, is connected to the sliding rod 75.

*Summary of operation.*

Figs. 1, 2 and 7 illustrate the condition of the mechanism when the clutch pedal 16 is pushed forward to extreme position to disengage the main driving clutch and when, also, the gear shifting lever 30 is in neutral position. At this time, the transmission coupling clutch, which includes the clutch-acting gear elements 44 and 45, is released and the secondary friction clutch, which includes the disks 42, 48 and 49, is also released, and at which time the shift gear shaft 26 and all the parts carried thereby are disconnected from the transmission shaft and from the engine shaft and, hence, either at rest or free to be stopped by any initial gear contact. Also, as before stated, the detaining plungers 53 are free, being in alignment with the perforations 58 of the lock bar 54. It is important to note that the latch arm 64 is interlocked with the rods 59ª and 60ª to hold the positive clutch released after the latch head 69 has been moved out of engagement with the forks 59 and 60 during the movement of the shift lever 30 from neutral position. It will also be noted that the head 82ª has been moved from between the rollers 80 and 83 and that the secondary friction clutch is still held released by the latch hook 84.

When the shift lever 30 is engaged with either of the shift rods 32 or 33 and is moved either forward or rearward, it first engages one or the other of the shift gears with its co-operating gear, (which action, as already described, is very easily accomplished because the shaft 26 is then free), and immediately after this is accomplished, it moves one or the other of the trip rods 86 against the lug 84ª of the latch hook 84, thereby releasing said hook from the latch abutment 85, permitting the lever 79 to drop and causing the secondary friction clutch to be set. Setting of said auxiliary friction clutch, as already indicated, will cause the slide gear shaft and parts carried thereby, including the clutch gears 44 and 45, to be rotated with the transmission shaft at the same speed as the clutch gear teeth 38 and 39. The above noted movement of the shift lever 30 also moved the cam head 69 to one side or the other of the cam abutment 68, but the latch hook 64 will still hold shifting forks 59 and 60 against movement.

When the clutch pedal 16 is released to set the main clutch, the lock bar 54 will be moved toward the right, and the first effect of this is to lock the plungers 53 to cause the cam surface 67, operating on the arm 66, to move the latch hook 64 and cause the same to release the shifting forks 59 and 60.

When said forks 59 and 60 are thus released, the springs 62 immediately become active to thrust the clutch gears 44 and 45 rearward and one or the other thereof will, as already described, immediately go into engagement between the co-operating internal gear teeth 38 or 39. As the clutch pedal 16 moves still further backward, the cam head 82ª will be drawn forward between the rollers 80 and 83 and the arm 79 will be raised. Raising of the arm 79 immediately releases the secondary friction clutch and it also re-engages the latch hook 84 with the latch abutment 85, or engages the rod 86 projecting over the abutment 85 and raises the same in the slotted flange 85ª, and at which time is spring pressed toward the abutment to cause its lug 84ª to re-engage with said abutment.

As the clutch pedal 16 reaches its extreme rearward position, the main friction clutch 15 may be again set and the power will then be transmitted to the traction wheels of the automobile or vehicle. Both of the clutch gears 44 and 45 may sometimes go simultaneously into action, but if one is retarded, the engaged gear will take the initial torque transmitted after the main clutch is set and the detained clutch gear will then be automatically aligned with its co-operating internal teeth and will instantly and automatically go into action.

Before the shift gear lever 30 can be again moved to neutral position, the clutch pedal 16 must, of course, be forced forward, as shown in Fig. 2 which movement, as already described, moves the lock bar 54 to a position in which its perforations 58 overlie the plungers 53. When said lever 30 is then moved to neutral position, the movement thereby imparted to the sliding rod 75 will again position the cam head 69 between the abutment 68 and the base ends of the shifting forks 59 and 60, and this, of course, again moves the clutch elements 44 and 45 out of engagement with the clutch teeth 38 and 39, as shown in Fig. 7, thereby uncoupling the slide gear or shift gear shaft 26 from the transmission or driven shaft 27—27ª. Said movement of the lever 30 to neutral position also again positions the two trip rods 86 with their free ends aligned with the lug 84ª of the latch hook 84. The complete cycle of operations, starting from the positions of parts shown in Figs. 1, 2 and 7 and returning to the same positions, has now been described. Attention may be further called to the fact that the so-called lock bar 54 performs two distinct functions, to wit: it locks the plungers 53 and serves to trip the latch 64 and is important for both of such purposes.

What I claim is:

1. The combination with a driving shaft and a driven shaft, of a clutch for connecting said two shafts, said clutch comprising a clutch member rotatable with the driven shaft and provided with laterally spaced gear teeth, and two gear-like clutch members rotatable with but independently slidable on the driving shaft, said two clutch elements having spaces from which teeth are omitted and adapting the two toothed sliding clutch elements to go into action in succession.

2. The combination with a driving shaft, a driven shaft, an intermediate shift gear shaft, variable speed selective shift gears for connecting the driving shaft to the shift gear shaft, an engine shaft, and a main clutch for connecting the engine shaft to the driving shaft, of a positive clutch operative to connect the shift gear shaft to the driven shaft, a pedal for operating the main clutch, a lock for holding the positive clutch released, and connections operated by the pedal and operative to release said lock when the pedal is released and returns to normal position.

3. The structure defined in claim 2 in further combination with automatic means for connecting the shift gear shaft to the driven shaft when the positive clutch is released.

4. The structure defined in claim 2 in further combination with friction clutch for connecting the shift gear shaft to the driven shaft when the positive clutch is released, and automatic means for releasing the friction clutch and throwing the positive clutch into action under the clutch-setting movement of the pedal.

5. The combination with a driving shaft, a driven shaft, an intermediate shift gear shaft, variable speed selective shift gears for connecting the driving shaft to the shift gear shaft, an engine shaft, and a main clutch for connecting the engine shaft to the driving shaft, of a positive clutch operative to connect the shift gear shaft to the driven shaft for the transmission of power, a friction clutch for temporarily connecting the shift gear shaft to the driven shaft, a pedal for operating the main clutch, a lock for holding the positive clutch released, connections operated by the pedal and operative to release said lock when the pedal is released and returns to normal position, automatic means for connecting the shift gear shaft to the driven shaft when the positive clutch is released, and automatic means for releasing the friction clutch and throwing the positive clutch into action under the clutch-setting movement of the wheel.

6. The combination with a driving shaft, a driven shaft, an intermediate shift gear shaft, variable speed selective shift gears for connecting the driving shaft to the shift gear shaft, an engine shaft, and a main clutch for connecting the engine shaft to the driving shaft, of a positive clutch operative to connect the shift gear shaft to the driven shaft for the transmission of power, a friction clutch for temporarily connecting the shift gear shaft to the driven shaft, a pedal for operating the main clutch, a lock for holding the positive clutch released, and connections operated by the pedal and operative to release said lock when the pedal is released and returned to normal position.

In testimony whereof I affix my signature.

RAYMOND G. ESTERBY.